Figure 1:
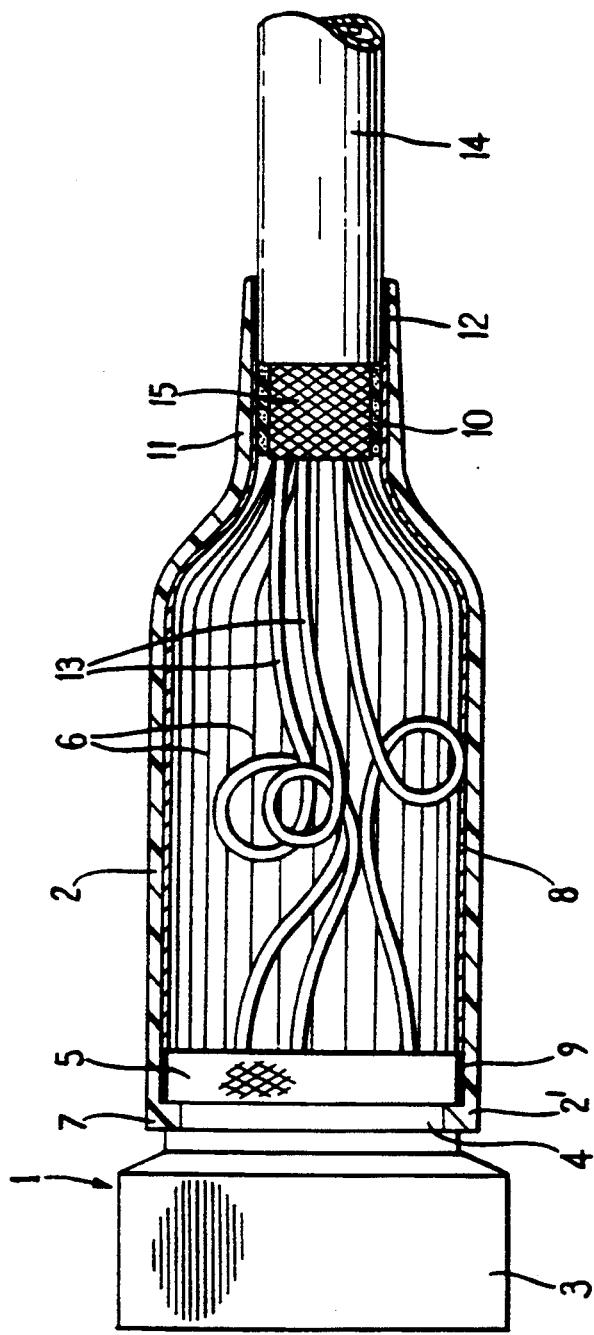

United States Patent [19]

Carter et al.

[11] Patent Number: 5,399,808
[45] Date of Patent: Mar. 21, 1995

[54] DIMENSIONALLY-RECOVERABLE ARRANGEMENT

[75] Inventors: Richard Carter; Adam C. S. Grover; Derrick S. Collett, all of Swindon, England

[73] Assignee: Raychem Limited, United Kingdom

[21] Appl. No.: 142,436

[22] PCT Filed: May 28, 1992

[86] PCT No.: PCT/GB92/00960
§ 371 Date: Feb. 28, 1994
§ 102(e) Date: Feb. 28, 1994

[87] PCT Pub. No.: WO92/22115
PCT Pub. Date: Dec. 10, 1992

[30] Foreign Application Priority Data

May 30, 1991 [GB] United Kingdom ............. 9111633

[51] Int. Cl.⁶ ........................................ H02G 15/04
[52] U.S. Cl. ........................ 174/80; 174/35 C; 174/36; 174/74 R; 174/DIG. 8; 439/610
[58] Field of Search ............ 174/80, 74 R, 74 A, 174/DIG. 8, 75 C, 35 C, 36; 439/98, 610

[56] References Cited

U.S. PATENT DOCUMENTS

| | | | |
|---|---|---|---|
| 4,433,206 | 2/1984 | Lewis | 174/35 C |
| 4,467,002 | 8/1984 | Crofts | 428/36 |
| 4,766,267 | 8/1988 | Gray et al. | 174/36 |
| 4,896,000 | 1/1990 | Procter et al. | 174/74 R |
| 5,098,753 | 3/1992 | Gregory et al. | 174/DIG. 8 |

FOREIGN PATENT DOCUMENTS

| | | |
|---|---|---|
| 0238203A2 | 9/1987 | European Pat. Off. . |
| 0402046A3 | 12/1990 | European Pat. Off. . |
| 0453374A2 | 10/1991 | European Pat. Off. . |
| 3934112A1 | 3/1990 | Germany . |
| 2199200 | 6/1988 | United Kingdom . |
| WO91/06961 | 5/1991 | WIPO . |

Primary Examiner—Morris H. Nimmo
Attorney, Agent, or Firm—Sheri M. Novack; Herbert G. Burkard

[57] ABSTRACT

An arrangement for enclosing the termination of a screened electrical cable to an electrical conductor comprises a coupling element, e.g. an adaptor (1) that is intended to engage the connector and is formed from a metal having a conductive passivate layer thereon, and a dimensionally recoverable article (2) for enclosing the termination after recovery onto the cable. The article (2) includes an electrical screen (8) and is partially recovered into engagement with the coupling element (1) so that an end of the screen (8) is in electrical contract with a portion (5) of the coupling element. The portion (5) of the coupling element has no passivate layer thereon.

It has been found that the electrical resistance of the band formed between the screen (8) and the coupling element (1) is relatively constant during storage at elevated temperature.

8 Claims, 2 Drawing Sheets

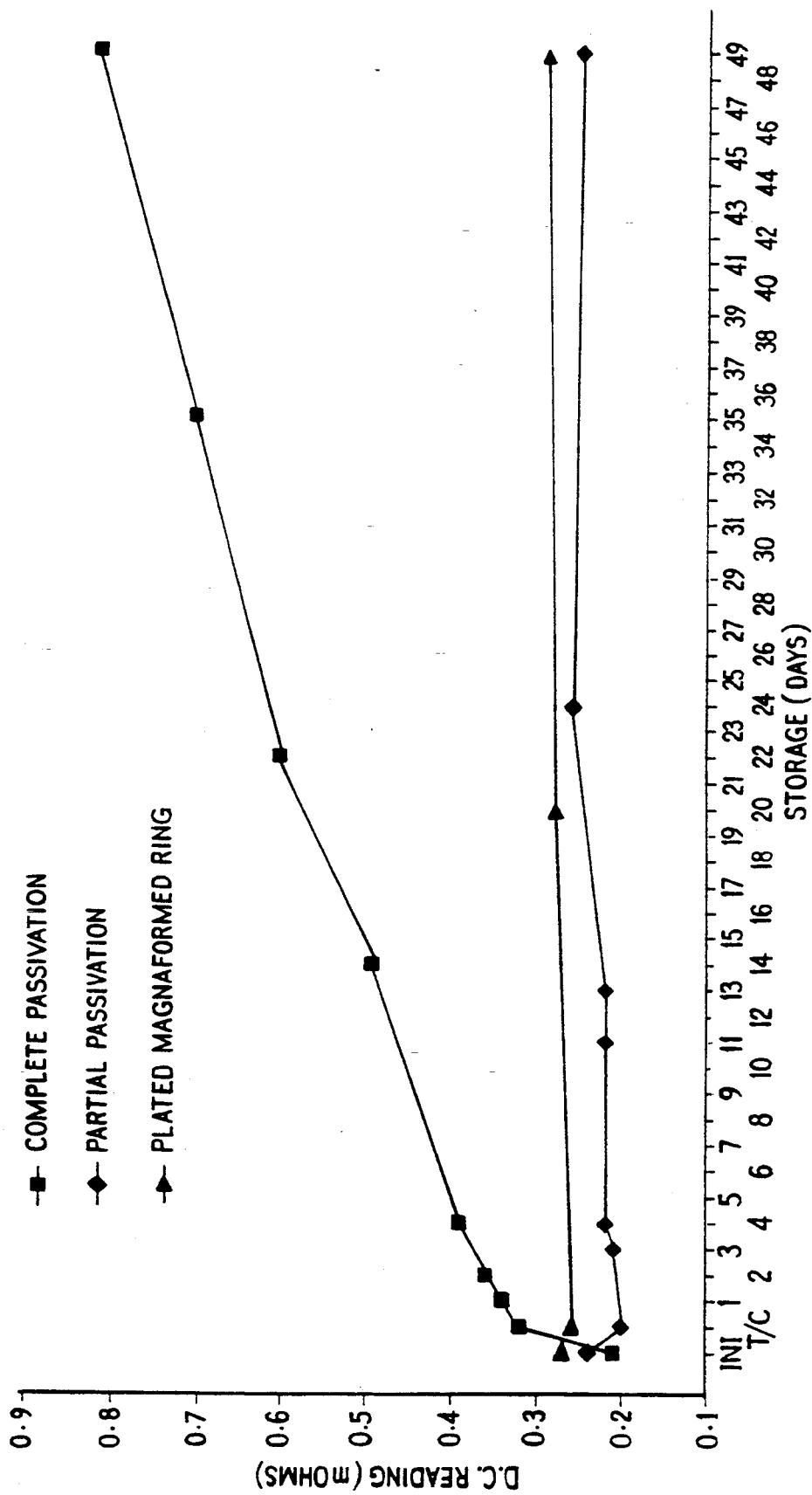

DIMENSIONALLY-RECOVERABLE ARRANGEMENT

This invention relates to the termination of screened electrical cables to electrical connectors, in particular to terminations which are enclosed by means of dimensionally recoverable articles, and especially by means of dimensionally heat-recoverable articles.

A heat-recoverable article is an article the dimensional configuration of which may be made substantially to change when subjected to heat treatment.

Usually these articles recover, on heating, towards an original shape from which they have previously been deformed by the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962 and 3,086,242. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat-stable article is deformed to a dimensionally heat-unstable form in a separate stage.

Dimensionally recoverable moulded articles have been widely employed for enclosing the termination of screened electrical cables to electrical connectors for example as part of an electrical harness. If the cable is screened against electromagnetic interference it may be desirable to employ a recoverable article that includes an electrical screen in order to provide continuity of screening between the connector and the screen of the cable. One such article is described in British Patent Specification No. 2,113,022 A, although other forms of recoverable articles that include screens are available. Recently it has been proposed to supply arrangements in which the recoverable articles are partially recovered onto a coupling element, for example a spin-coupling adaptor, of the electrical connector so that one end of the arrangement can be engaged with the connector by screwing, and only at the other end must an adhesive bond be formed by the customer, with the result that the screening performance of the terminated is improved. Typically the connector and the coupling element will be formed from a metal, for example aluminium that has a different metal coating thereon, eg. cadmium or a zinc-cobalt alloy, followed by a conductive passivate layer, for example a chromate passivate layer formed by immersing the coupling element in a chromate passivating agent. In the case of cadmium plated articles this chromate passivate layer gives the articles a characteristic "olive drab" appearance.

Although such arrangement perform well in practice, we have found that extended storage of the arrangements particularly at elevated temperatures can cause the resistance of the bond between the screen of the dimensionally recoverable article and the coupling member to increase. This increase in resistance can cause problems in determining the quality of the adhesive bond between recoverable article and the coupling member during manufacture or between the recoverable article and the cable screen during termination of the cable because this is normally tested electrically by measuring the dc resistance across the adhesive bond, and any drift of the resistance value removes any reference value against which the quality of the bond can be judged.

According to the present invention, there is provided an arrangement for enclosing the termination of a screened electrical cable to an electrical connector, which comprises a coupling element that is intended to engage the electrical connector and which is formed from a metal having a conductive passivate layer thereon, and a dimensionally recoverable article for enclosing the termination after recovery onto the cable, which article includes an electrical screen and is partially recovered into engagement with the coupling element so that an end of the electrical screen is in electrical contact with the portion of the coupling element, wherein the portion of the coupling element with which the electrical screen is in electrical contact has no passivate layer thereon.

The arrangement in accordance with the invention has the advantage that it enables a relatively constant d.c. resistance to be obtained between the screen of the recoverable article and the coupling element even when the arrangement is subjected to thermal cycling, thus enabling the quality of the adhesive bonds to be checked electrically. In addition, the reduction in increase of resistance will enable the long term d.c. resistance specification of the arrangement to be improved.

The reason for the increase in d.c. electrical resistance observed in the prior arrangements is not understood, nor is the reason why the resistance should be more stable in the absence of the passivate layer. It would appear, for example, that the resistance increase in the prior arrangements is not due to any galvanic corrosion occuring for example between the coupling element and metal in the adhesive since the resistance increase was observed in the absence of any electrolyte, and in any case, the passivate layer is provided on the coupling element in order to prevent any corrosion.

The coupling element may be provided with a passivate layer that extends over most but not all of its external surface by a number of techniques. For example, the coupling element may be passivated over a portion of its surface only for example by masking off that portion which is to remain unpassivated. Alternatively the coupling element may be passivated over its entire surface and then the passivate may be removed from a portion of the surface, eg. by abrasion. Alternatively or in addition, if desired, a further layer of another metal may be formed on the portion of the coupling element. This may be achieved by cold forming a metal ring onto the portion of the coupling piece for example by means of a pulsed magnetic field (e.g. by the Magneform (TM) process). Alternatively the coupling piece may be formed in two parts, the portion on which the article is recovered being formed separately from the remainder of the coupling piece and being un passivated. The portion on which the article is recovered may be formed as an annulus having a threaded inner surface that allows it to be screwed onto the remainder of the coupling piece. The metal ring or annulus may be unplated or plated. For instance a plating of silver, gold, copper or tin may be employed with, for example, an aluminium ring. Plating metals that, retain conductive surfaces as storage, such as silver, gold and tin, are preferred.

The invention will now be described by way of example with reference to the accompanying drawings, in which:

FIG. 1 is an axial section along an arrangement according to the invention recovered about a harness branch; and FIG. 2 is a graphical representation of the electrical resistance along the arrangement.

Referring to the accompanying drawings, an arrangement according to the invention comprises a coupling adaptor 1 having a dimensionally heat-recoverable moulded article 2 partially recovered into engagement therewith. The adaptor 1 has a skirt 3 that is proved with an internal screw thread for engaging the adaptor with an appropriate connector, and a rear part of slightly smaller diameter that has a circumferentially extending recess 4 and a portion 5 on which one end of the heat-recoverable article 2 has been recovered.

The adaptor 1 is formed from aluminium and has been provided with a 3 to 20 micrometre thick layer of nickel followed by a 1 to 10 micrometre thick layer of cadmium. All surface regions of the adaptor with the exception of portion 5 have been coated with a chromate passivate layer, this layer having been applied to the adaptor after the portion 5 has been masked off.

The heat-recoverable moulded article is substantially as described in British patent specification No. 2,113,022 A. The moulded article has an internal surface that is formed with a number of longitudinally extending grooves 6 that are preferably chevron-shaped in cross-section, and one end 2' of the article has an inwardly facing lip 7. The internal surface of the article has a metallic layer 8 for screening against electromagnetic interference, the layer comprising a thin deposition of nickel formed by electroless deposition followed by an electrodeposited layer of copper and finally a layer of tin.

In the region of end 2' of the article adjacent to the inwardly directed lip, a layer of electrically conductive adhesive 9 is provided for forming an electrically conductive bond between the metal screen layer 8 and the coupling adaptor 1, the adhesive comprising a polymer having a metal particles therein, preferably an epoxy adhesive or a hot-melt adhesive based on a polyamide or ethylene copoloymer, containing a high loading of silver flake. A further layer of electrically conductive adhesive 10 is provided in the region of the opposite end 11 of the article together with an additional ring 12 of a non-conducting structural adhesive such as a polyamide hot-melt adhesive or an epoxy adhesive. Examples of such adhesives are given in International patent application No. WO91/06961.

The article has been assembled simply by positioning the end 2' of the moulded article over the rear part of the coupling adaptor 1 and partially recovering it into engagement therewith so that the lip 7 engages the groove 4 in the adaptor. During the partial recovery the adhesive 9 will fuse and form an electrically conductive bond between the metal screening layer 8 on the recoverable article and the portion 5 of the adaptor that is uncoated with the passivate layer.

The arrangement so formed may be employed to provide a screened enclosure at the end of an electrical harness where it is terminated with a connector. The arrangement is slipped onto the harness branch before the wires 13 are connected to the connector. The jacket 14 is stripped back to expose a length of the braid 15 of the harness branch and the arrangement is slid toward the connector so that the recoverable article encloses the exposed wires and braid. After coupling the adaptor to the connector the heat-shrinkable article is heated in order to cause the end 11 to recover about the harness branch, the conductive adhesive 10 forming an electrically conducting bond between the braid 15 and the screening layer 8 and the non-conducting adhesive 12 giving strength to the join between the article 2 and the jacket 14 of the cable branch.

FIG. 2 shows the dc resistance between the screening layer 8 of the article and the coupling adaptor 1 of the arrangement according to the present invention, and by way of comparison, the corresponding dc resistance for an arrangement in which the adaptor is completely passivated as the arrangements are subjected to a thermal cycling and heat aging test in which the arrangements were cycled between +75° C. and −55° C. for 10 cycles each lasting one hour, and were then stored in an oven at 75° C.

As can be seen from FIG. 2 the dc resistance of the bond varies by no more than 0.1 mohm throughout the entire test, whereas for the control sample in which the adaptor is completely passivated, the dc resistance increases by slightly more than 0.1 mohm during the temperature cycling and continues to rise during storage at elevated temperature, the last recorded resistance value being approximately 0.6 mohm higher than the initial value.

In a modification of the arrangement according to the invention the portion 5 of the adaptor 1 as shown in FIG. 1 is provided as a separate silver plated aluminium ring that has been positioned on the end of the adaptor and radially contracted out the adaptor by means of a pulsed magnetic field (the Magneform (TM) process). Before positioning the ring on the adaptor, that part of the adaptor over which the ring is to be positioned is abraided to remove the chromate passivate layer so that the ring is contracted out bright metal. The moulded article 2 may then be recovered onto the adaptor 1 as described above.

FIG. 2 also shows the dc screening resistance of the modified arrangement measured under the same conditions as described above. It can be seen that the dc resistance of the bond formed using the modified adaptor also varies by not more than 0.1 mohm during the entire test.

We claim:

1. An arrangement for enclosing the termination of a screened electrical cable to an electrical connector, which comprises a coupling element that is intended to engage the electrical connector and which is formed from a metal having a conductive passivate layer thereon, and a dimensionally recoverable article for enclosing the termination after recovery onto the cable, which article includes an electrical screen and is partially recovered into engagement with the coupling element so that an end of the electrical screen is in electrical contact with a portion of the coupling element, wherein the portion of the coupling element with which the electrical screen is in electrical contact has no passivate layer thereon.

2. An arrangement as claimed in claim 1, wherein the passivate layer is a chromate passivate.

3. An arrangement as claimed in claim 1, wherein the coupling element has a cadmium layer under the passivate layer.

4. An arrangement as claimed in claim 1, wherein the coupling element has a zinc-cobalt layer under the passivate layer.

5. An arrangement as claimed in claim 1, wherein the passivate layer has been formed on all surfaces of the coupling element except that of the said portion.

6. An arrangement as claimed in claim 1, wherein the coupling element comprises a plurality of component parts one of which is uncoated.

7. An arrangement as claimed in claim 1, wherein the electrical screen is bonded to the portion of the coupling element by means of an electrically conductive adhesive.

8. An arrangement as claimed in claim 7, wherein the adhesive comprises a polymer having metal particles dispersed therein.

* * * * *